(12) United States Patent
Wilnechenko et al.

(10) Patent No.: US 8,931,707 B2
(45) Date of Patent: *Jan. 13, 2015

(54) APPLIANCE WITH THERMOSTATIC CONTROLS

(75) Inventors: Bruce Wilnechenko, Burnaby (CA); Alex Schwartzman, Richmond (CA); Angelo Faccone, Burnaby (CA)

(73) Assignee: Marine Canada Acquisition Inc., Richmond (CA)

( * ) Notice: Subject to any disclaimer, the term of this patent is extended or adjusted under 35 U.S.C. 154(b) by 414 days.

This patent is subject to a terminal disclaimer.

(21) Appl. No.: 13/430,465

(22) Filed: Mar. 26, 2012

(65) Prior Publication Data

US 2012/0241528 A1     Sep. 27, 2012

Related U.S. Application Data

(63) Continuation-in-part of application No. 12/368,941, filed on Feb. 10, 2009, now Pat. No. 8,141,788.

(60) Provisional application No. 61/027,748, filed on Feb. 11, 2008.

(51) Int. Cl.
| | |
|---|---|
| *F24C 3/12* | (2006.01) |
| *F23N 1/02* | (2006.01) |
| *G05D 23/19* | (2006.01) |
| *F23N 5/02* | (2006.01) |
| *A47J 37/07* | (2006.01) |

(52) U.S. Cl.
CPC ............ *F24C 3/126* (2013.01); *G05D 23/1902* (2013.01); *F23N 5/02* (2013.01); *A47J 37/0713* (2013.01)
USPC .......... 236/15 A; 236/15 BD; 431/12; 431/89

(58) Field of Classification Search
USPC .... 236/15 A, 15 BD, 1 A, 1 H, 11; 431/6, 12, 431/89
See application file for complete search history.

(56) References Cited

U.S. PATENT DOCUMENTS

| | | | |
|---|---|---|---|
| 3,563,457 | A | 2/1971 | Bergquist et al. |
| 3,582,249 | A | 6/1971 | Hodgson |
| 3,727,073 | A | 4/1973 | Cade |
| 3,762,639 | A | 10/1973 | Katchka et al. |

(Continued)

FOREIGN PATENT DOCUMENTS

| | | |
|---|---|---|
| EP | 0 143 865 | 12/1985 |
| GB | 504186 | 4/1939 |

(Continued)

*Primary Examiner* — Marc Norman
(74) *Attorney, Agent, or Firm* — Cameron IP

(57) ABSTRACT

An appliance comprises a burner and a compressor for supplying pressurized air to the burner in order to create a low-pressure area for siphoning fuel to the burner. A flame sensor senses for the presence or absence of a flame in the burner and a temperature sensor senses an actual temperature of the appliance. There is a controller in communication with the temperature sensor. The controller shuts off the compressor and overrides the flame sensor such that the appliance acts as if a flame is present when the temperature sensor senses that the actual temperature of the appliance is greater than a maximum threshold temperature. The controller starts up the compressor overriding the flame sensor such that the appliance acts as if a flame is absent when the temperature sensor senses that the actual temperature of appliance is less than a minimum threshold temperature.

7 Claims, 11 Drawing Sheets

(56) References Cited

U.S. PATENT DOCUMENTS

| | | |
|---|---|---|
| 3,820,399 A | 6/1974 | de Gouville |
| 4,242,078 A | 12/1980 | Nelson et al. |
| 4,325,689 A | 4/1982 | Burke |
| 4,352,656 A | 10/1982 | Michaud et al. |
| 8,141,788 B2 | 3/2012 | Schwartzman et al. |
| 8,141,789 B2 | 3/2012 | Schwartzman et al. |
| 2006/0172238 A1 | 8/2006 | Cook |

FOREIGN PATENT DOCUMENTS

| | | |
|---|---|---|
| GB | 755927 | 8/1956 |
| GB | 842453 | 7/1960 |
| GB | 1 343 053 | 1/1974 |
| GB | 1 569 761 | 6/1980 |

APPLIANCE WITH THERMOSTATIC CONTROLS

CROSS-REFERENCE TO RELATED APPLICATION

Field of the Invention

This is continuation-in-part of application Ser. No. 12/368,941 which was filed in the United States Patent and Trademark Office on Feb. 10, 2009 now U.S. Pat. No. 8,141,788 which is based on provisional application No. 61/027,748 filed in the United States Patent and Trademark Office on Feb. 11, 2008, the complete disclosures of which are incorporated herein by reference and priority to which are claimed.

BACKGROUND OF THE INVENTION

1. Field of the Invention

This invention relates to thermostatic controls and, in particular, to thermostatic controls an appliance such as a food preparation or a sanitation appliance.

2. Description of the Related Art

U.S. Pat. No. 6,450,801 assigned to Teleflex Canada Limited Partnership discloses a much improved portable liquid fuel stove as compared with earlier equipment of this nature. The stove is utilized for various purposes including cooking during military field operations. It is used in appliances such as range ovens, steam tables, tray ration heaters, field sanitation equipment, and stock pot heating racks. These appliances perform functions like roasting, grilling, broiling, frying, heating water and other liquids, and baking. In military field operations, the stove is often required to operate under difficult conditions and therefore must be reliable in operation and capable of performing at a high level in order to meet the demands of the users.

The above-described stove comprises a burner unit which combines a series of different functions including regulating fuel flow from low to high, infinitely, relative to the position of a control knob. The output of the burner unit may be manually and intermittently adjusted, through rotation of the control knob, to maintain a desired temperature. This may be labour intensive and inconvenient. Accordingly, there is a need for an improved means of controlling the output of the burner unit and temperature of the stove.

SUMMARY OF THE INVENTION

It is an object of the present invention to provide an improved means for controlling the temperature of an appliance, for example, a food preparation appliance or sanitation appliance.

There is provided an appliance comprising a burner and a compressor for supplying pressurized air to the burner in order to create a low-pressure area for siphoning fuel to the burner. A flame sensor senses for the presence or absence of a flame in the burner and a temperature sensor senses an actual temperature of the appliance. There is a controller in communication with the temperature sensor. The controller shuts off the compressor and overrides the flame sensor such that the appliance acts as if a flame is present when the temperature sensor senses that the actual temperature of the appliance is greater than a maximum threshold temperature. The controller starts up the compressor overriding the flame sensor such that the appliance acts as if a flame is absent when the temperature sensor senses that the actual temperature of appliance is less than a minimum threshold temperature. There is a control panel in communication with the controller. The control panel has an input mechanism for inputting a desired set temperature point into the controller and a display for displaying the actual temperature of the appliance and the set temperature point. The set temperature point is greater than the minimum threshold temperature and the set temperature point is less than the maximum threshold temperature.

The input mechanism may include two input keys which respectively allow for upward and downward adjustment of the set temperature point. The appliance may further include a temperature probe connection receptacle on the control panel and/or an integral temperature probe connection harness with a temperature probe connector. The temperature sensor may be a quick-connect temperature probe. The appliance may be a food preparation or a sanitation appliance.

BRIEF DESCRIPTIONS OF DRAWINGS

Referring to the drawings.

DESCRIPTIONS OF THE PREFERRED EMBODIMENTS

Figure 1:
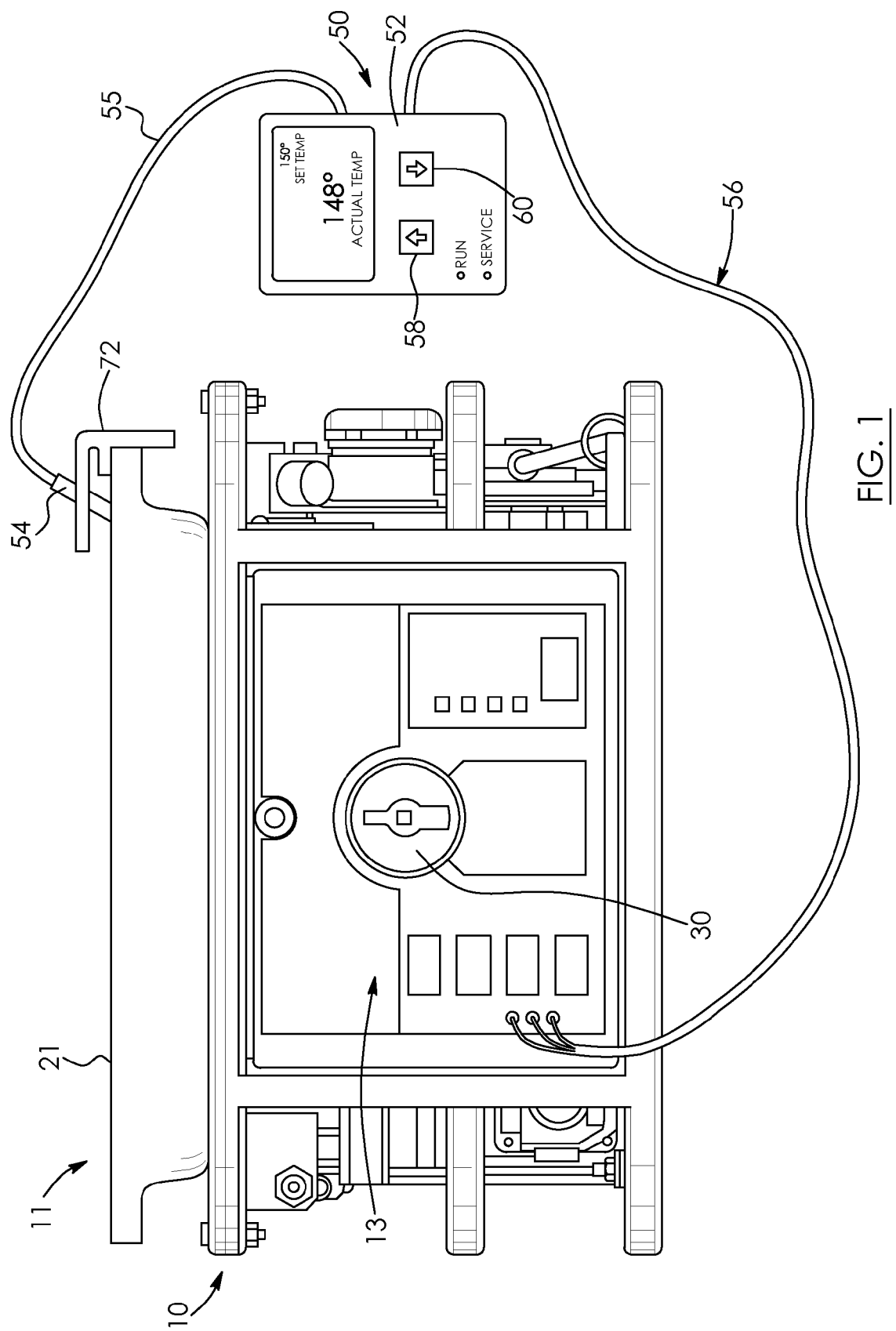
FIG. 1 is an front elevation view of a thermostatic control device interfaced with a stove.

Referring to the drawings and first to FIG. 1, this shows a stove 10 and a thermostatic control device 50. The stove 10 is similar to the type disclosed in U.S. Pat. No. 6,450,801 to Wilnecheko et al., the complete disclosure of which is incorporated herein by reference. The stove 10 provides heat for a tray ration heater 17. In this example, the stove 10 and the tray ration heater 17 together are considered to be a single appliance 11. However, in other examples, the stove itself may be considered an appliance.

Figure 2:
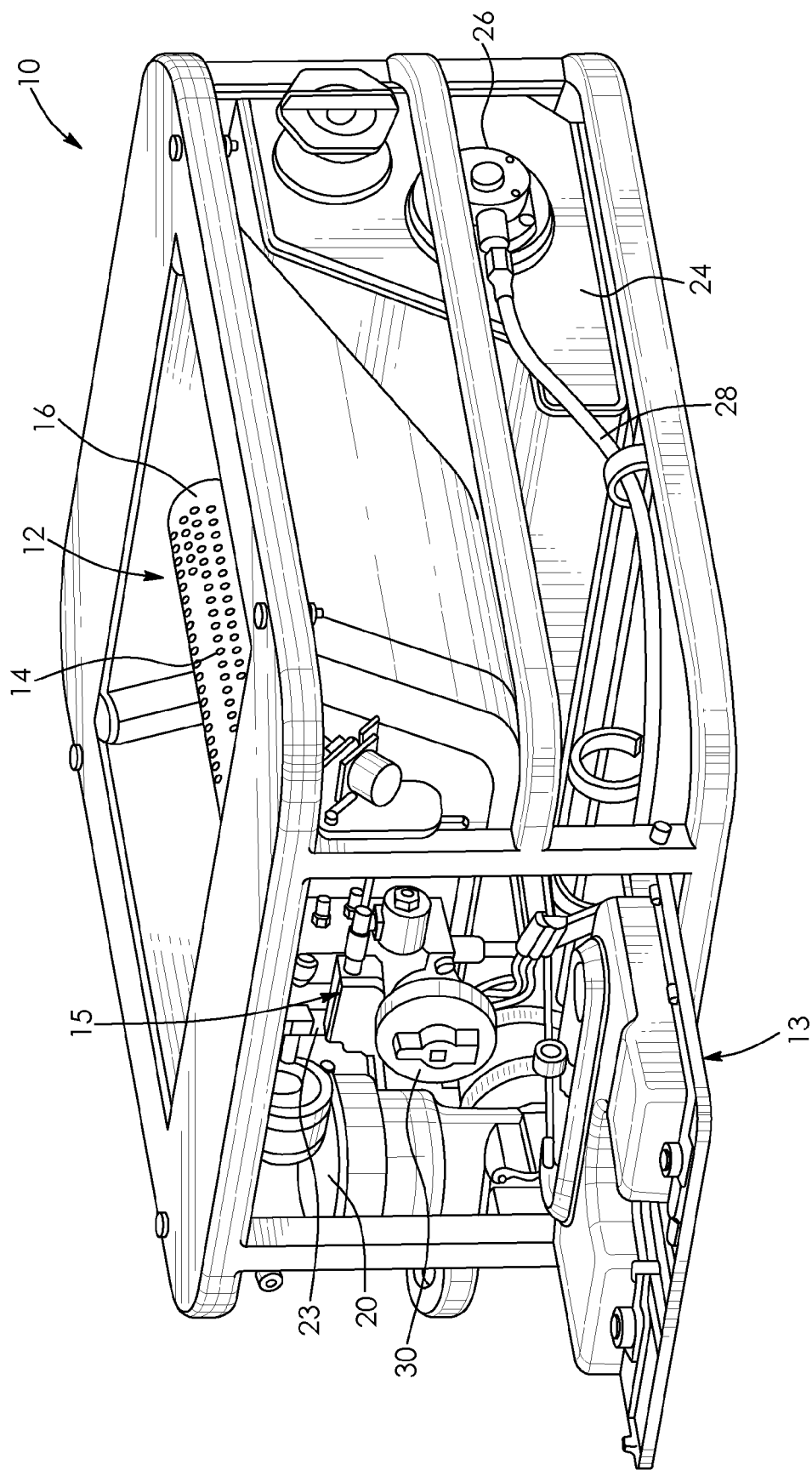
FIG. 2 is an isometric view of the stove of FIG. 1.

As best shown in FIG. 2, the stove 10 comprises a burner unit 12 which includes an air aspiration, infrared burner 14 similar to the type disclosed in U.S. Pat. No. 5,527,180 to Robinson et al., the complete disclosure of which is also incorporated herein by reference. The burner 14 utilizes a two-stage combustion process which re-circulates combustion gases to achieve complete fuel vaporization. By re-circulating the combustion products and re-burning the gases within a burner head 16, the two-stage process burns virtually all of the hydrocarbons, approaching complete combustion. The benefits of a complete combustion are numerous, including maximum efficiency and heat transfer, little to no smoke, and very low carbon monoxide emissions. When multiple stove units are used in an enclosed kitchen, near complete combustion is necessary to ensure the health and safety of cooking staff. The infrared burner technology helps preserve clean breathable kitchen air.

Figure 3:
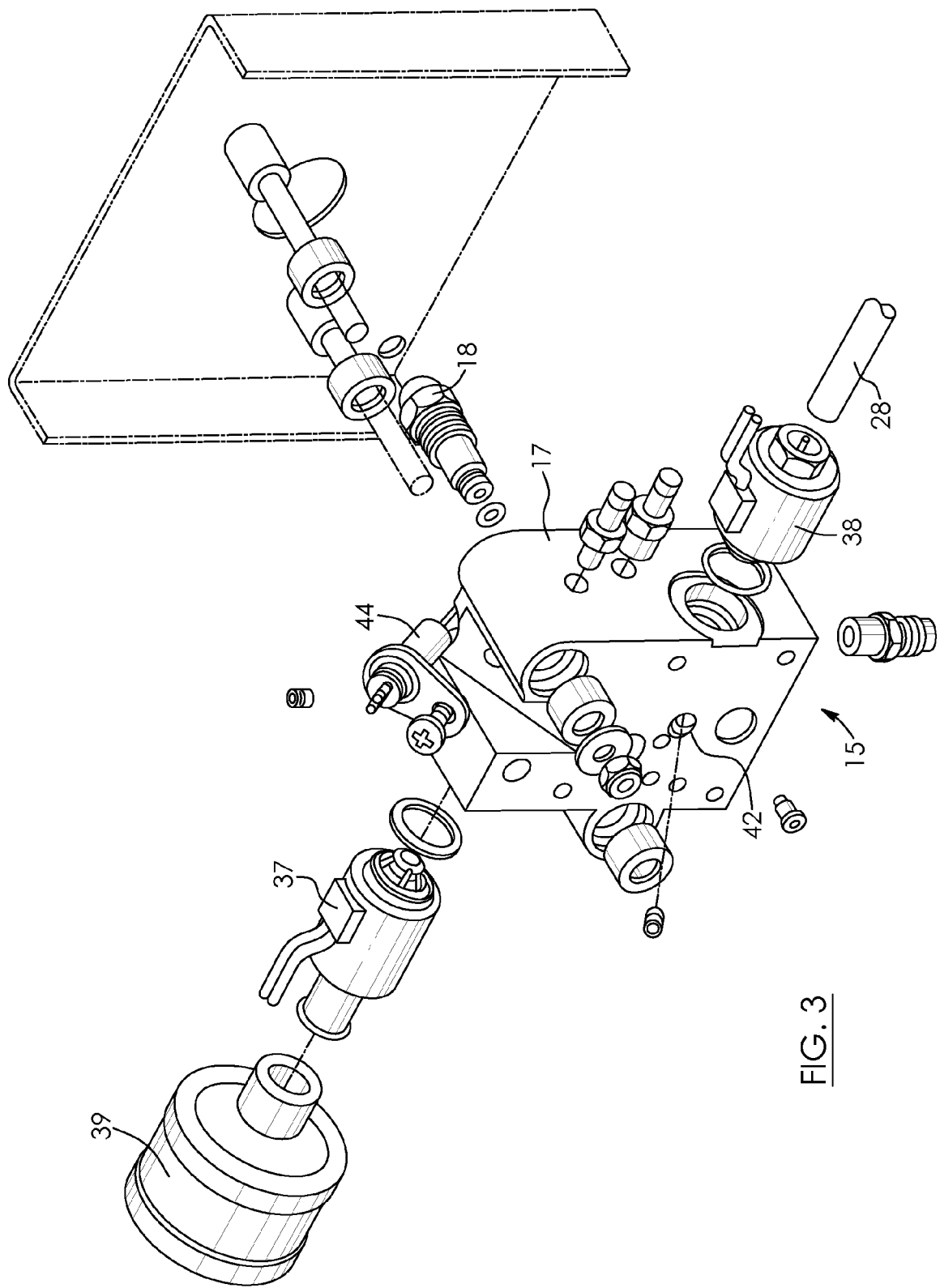
FIG. 3 is an isometric, exploded view of a portion of a fuel delivery assembly of the stove of FIG. 1.

The burner 14 is supplied with fuel by fuel delivery assembly 15 which is shown in greater detail in FIG. 3. The fuel delivery assembly 15 comprises a fuel block 17 and an air atomizing type nozzle 18. The purpose of the nozzle 18 is to transform liquid fuel into a finely atomized spray with increased surface area to promote the mixing of air and fuel, and facilitate evaporation. In this example, the nozzle 18 is a twin fluid air-assist type nozzle, also known as a siphon type air atomizing nozzle, in which the introduction of high velocity air into a slow-moving fuel causes the fuel to be disintegrated by mechanical energy from the air. Referring back to FIG. 2, a compressor 20 supplies pressurized air to the nozzle 18, shown in FIG. 3, through an air conduit 23. This creates a low pressure area inside the nozzle cavity. The low pressure is used to siphon fuel from a fuel container 24, through a fuel regulator 26 and a siphoning fuel line 28, to the nozzle 18. The nozzle 18 provides an atomized fuel spray which is ignited within a combustion chamber of the burner unit 12. A control knob 30 is used to regulate both the output of the compressor 20 and the flow of fuel to the nozzle 18.

Figure 4:
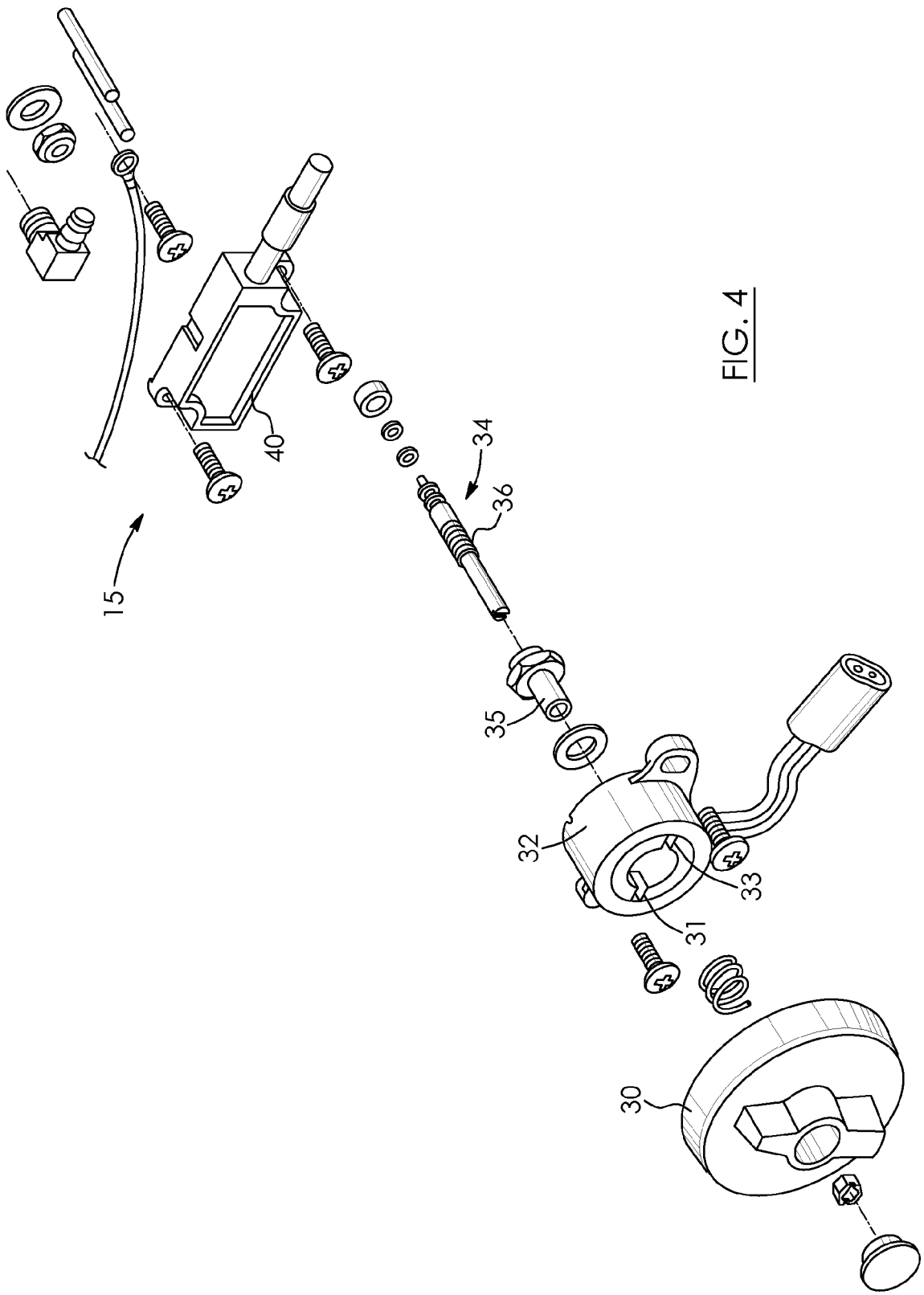
FIG. 4 is a continuation of FIG. 3 showing a flame sensor, needle valve, and air valve of the fuel delivery assembly.

As best shown in FIG. 4, the control knob 30 is coupled to both a feedback potentiometer 32 and a needle valve 34. The control knob 30 engages slots 31 and 33 on the feedback potentiometer 32. The control knob 30 also engages a cap 35 of the needle valve 34. The feedback potentiometer 32 controls the output of the compressor 20 and accordingly the air pressure in the nozzle 18. The needle valve 34 has male threading 36 which engages corresponding female threading (not shown) in the fuel block 17 which is shown in FIG. 3. As the stove 10 operates, fuel is siphoned from the fuel container 24 through the fuel regulator 26 and the fuel line 28, all of which are shown in FIG. 2. Fuel then flows from the fuel line 28 through a fuel valve 38 which, in this example, is a shut off solenoid valve shown in FIG. 3. Finally fuel flows from through the fuel valve 38 to the needle valve 34, shown in FIG. 4, and to the nozzle 18. Rotation of the control knob 30 causes axial movement of a valve stem (not shown) of the needle valve 34 which controls the flow of fuel to the nozzle 18. At the same time, the control knob 30 also rotates the feedback potentiometer 32 to control the speed of the compressor so that the amount of pressurized air supplied to the nozzle 18 is correct for the amount of fuel being supplied through the fuel line 28. Accordingly, when the control knob 30 is rotated, two fuel flow parameters are altered simultaneously. These two fuel control parameters are arranged so that a linear fuel rate is maintained.

An igniter 44, shown in FIG. 3, is mounted on the fuel block 17. The igniter 44 ignites the air fuel mixture expelled from the nozzle 18. The igniter 44 is attached to the fuel block 17 so its position relative to the nozzle 18 and fuel spray is maintained. This ensures reliable flame ignition and longer igniter life. A flame sensor 40, shown in FIG. 4, is also mounted on the fuel block 17. The flame sensor 40 views a flame in the burner 12 through an aperture 42, shown in FIG. 3, in the fuel block 17. The flame sensor 40 is located immediately beside the nozzle 18, optimizing the viewing angle. The view of the flame sensor 40 is generally parallel to a longitudinal axis of nozzle 18.

The flame sensor 40 measures the flame intensity and converts it to a DC voltage signal. The flame sensor 40 is designed to respond to changing light intensity rather than responding to steady-state light intensity. All flames have a characteristic changing light intensity or flicker frequency. The flame sensor 40 is tuned to respond to a specific flame flicker frequency and ignore other sources of light intensities such as sunlight or fluorescent light. The flame sensor 40 measures the flame intensity in the infrared spectrum. A threshold value for the DC signal is established. If the DC signal is over the threshold a flame is present. If the DC signal is below the threshold no flame is present. When no flame is present the flame sensor 40 signals a stove controller 27, shown in FIG. 6, to shut down the stove 10. The stove controller 27 is in the form of a micro-processor and controls all electrical and process functions of the stove 10. The stove controller 27 controls and modulates the input voltage and output voltage as constant voltage components using PWM control. In this example, each of the output circuits utilizes MOSFET style transistors with internal thermal protection to control the required devices.

Figure 6:
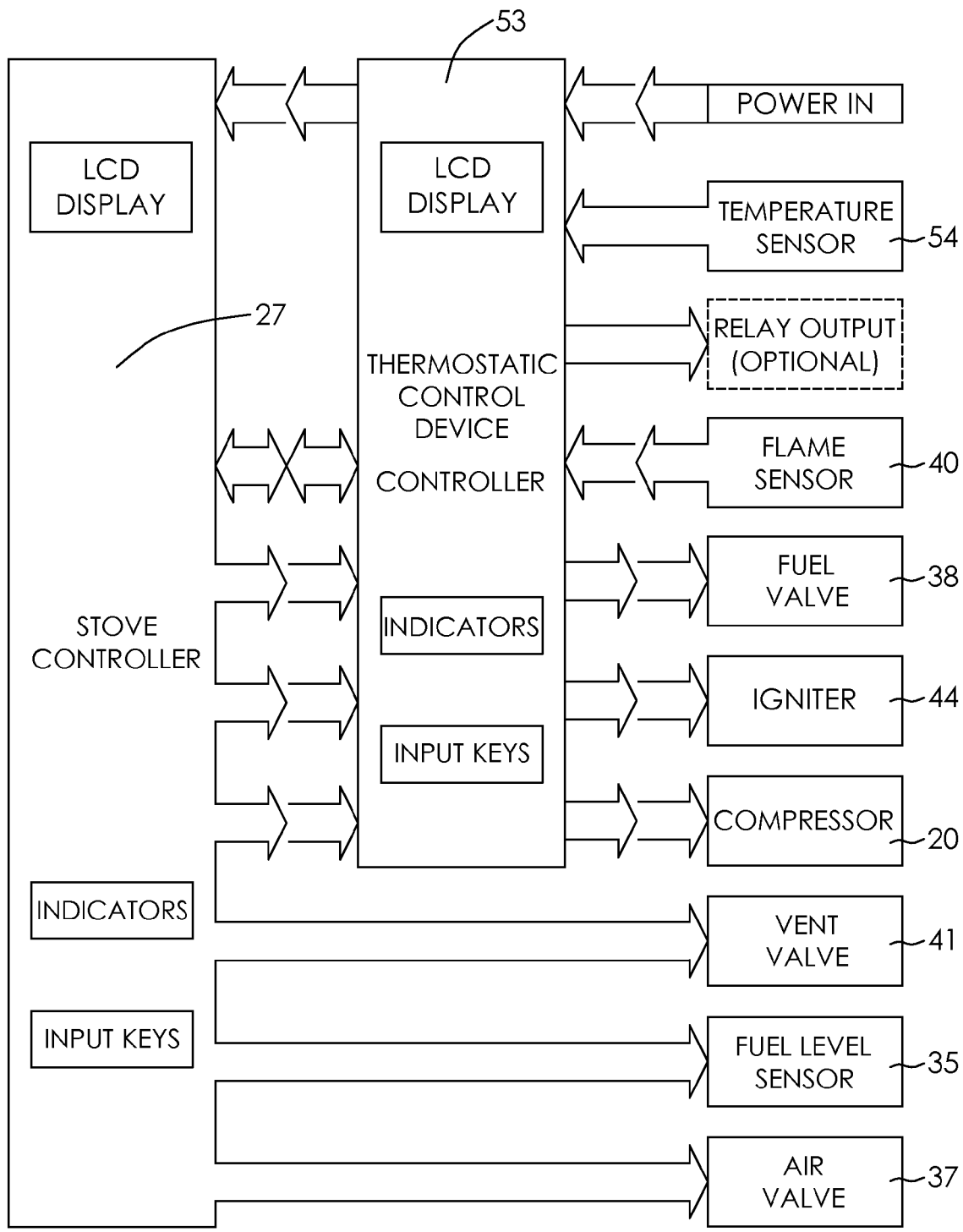
FIG. 6 is a block diagram illustrating the interface between the thermostatic control device and stove and FIG. 1.

The fuel delivery assembly 15, as shown in FIG. 3, further includes an air valve 37 which in this example is a three-way, two position solenoid valve. The air valve 37 selects between an air filter 39 and a vent assembly (not shown). This allows the compressor 20 to operate in two modes. In a first mode, the air valve 37 is in a normal position, and air is drawn through the air filter 39 allowing the compressor 20 to supply pressurized air to the nozzle 18. In a second mode, the air valve 37 is in an energized position, and air is drawn from the vent assembly to assist in re-fuelling the fuel container 24 by drawing air from the fuel container 24 and drawing fuel into the fuel container 24 through a fuel supply line (not shown). Referring to FIG. 6, the vent assembly also includes a vent valve 41 for the fuel container 24 which, in this example, is a shut off solenoid valve. The vent valve 41 is closed during re-fuelling and when the stove 10 is non-operational to create a low pressure area in the fuel container 24. When the stove 10 is operational the vent valve 41 is open to maintain the fuel at atmospheric pressure. There is also a fuel level sensor 35, also shown in FIG. 6, which signals the stove controller to stop the compressor 20 when the fuel container 24 is full. The fuel level sensor may also signal the stove controller when the fuel container 24 is empty.

Figure 5:
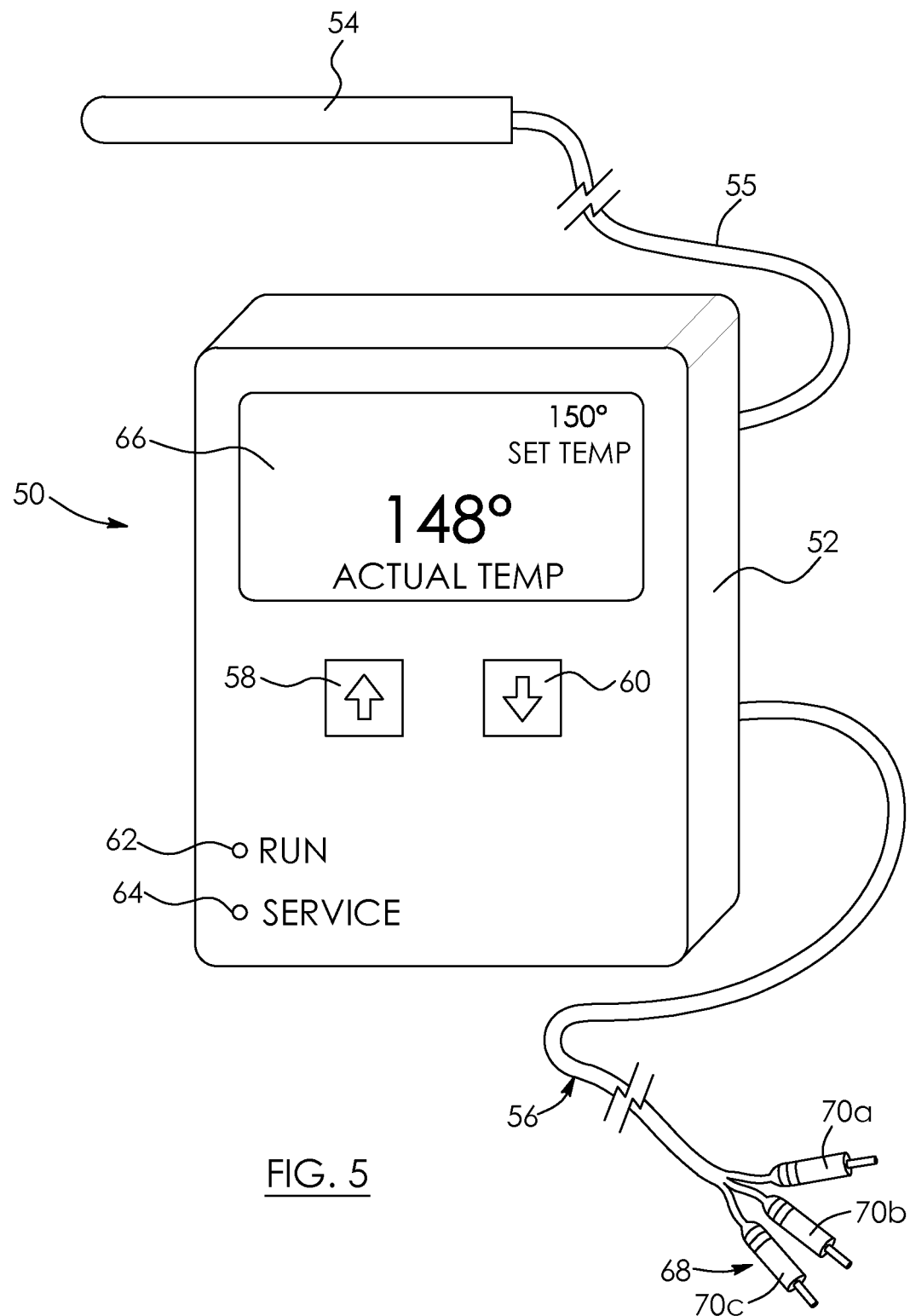
FIG. 5 is an isometric view of the thermostatic control device of FIG. 1.

The thermostatic control device 50 is best shown in FIG. 5 and generally comprises a control box 52, a temperature sensor 54, and a wiring harness 56. In this example, the control box 52 has an input mechanism including two input keys 58 and 60 which allow for the adjustment of a set temperature point. One input key 58 is used to increase the set temperature point and the other input key 60 is used to decrease the set temperature point. The set temperature point may be any temperature value and, preferably, between a minimum temperature of 100° F. and a maximum temperature of 500° F. The control box 52 also includes two indicators 62 and 64. Indicator 62 is a green RUN indicator and signifies that the thermostatic control device 50 is operating in a temperature control mode. Indicator 64 is a red SERVICE indicator and signifies that a fault has occurred. There is an easily readable alpha-numeric display 66 disposed on a front of the thermostatic control device 50. In this example, the display 66 is a bright LCD upon which both the actual temperature of the appliance and set temperature point are displayed as shown. The actual temperature of the appliance is shown larger than the set temperature point and is located near the center of the display 66 in the illustrated example. The set temperature point is located in an upper right hand corner of the display 66 in the illustrated example. The display 66 may also relay output regarding the operation of the thermostatic control device 50. In other examples the display could vary.

The temperature sensor 54 is operatively connected by a cable 55 to a sealed connector (not shown) on a back of the thermostatic control device 50. Preferably, the temperature sensor 54 is able to be connected to and disconnected from the control box 52 without the use of tools. In this example, the temperature sensor 54 is a direct-connect temperature probe. However, any suitable temperature sensor may be used. The harness 56 is also sealedly connected to the back of the control box 52 and, preferably, permanently connected to the back the back of the control box 52. A distal end 68 of the harness 56 has a sufficient amount and style of connectors 70a, 70b, and 70c to properly interface with various food preparation or sanitation appliances. The harness 56 may also be provided with a protective sheath to protect the wiring from dirt, food and other miscellaneous debris. In this example, the harness 56 interfaces the thermostatic control device 50 with the stove 10 as shown in FIG. 1. However, any other suitable means such as wireless communications may be used to interface the thermostatic control device with an appliance.

In operation, and as best shown in FIG. 1, the harness 56 operatively connects the thermostatic control device 50 to a control panel 13 of the stove 10. The stove 10 provides a power source for the thermostatic control device 50. In this example, the control panel 13 is hingedly connected to the stove 10 and may be opened as shown in FIG. 2. The control panel 13 also houses the stove controller 27 which is shown in FIG. 6. The temperature sensor 54 is retained by a bracket 72 mounted on the appliance 11 and is able to sense the actual temperature of the appliance 11. When the stove 10 is powered-up the thermostatic control device 50 may also be powered-up. Alternatively, when the thermostatic control device 50 is powered-up the stove 10 may also be powered-up. A user may enter a desired set temperature point into the thermostatic control device 50 using the input keys 58 and 60. The thermostatic control device 50 then operates the stove 10 in a flame on/flame out fashion to maintain the actual temperature of the appliance 11 at or about the set temperature point. The thermostatic control device 50 may also be provided with a mounting bracket to allow for mounting of the thermostatic control device 50 on the stove 10, the appliance 11, or another support structure.

Referring now to FIG. 6, this is a block diagram illustrating the interface between the thermostatic control device 50 and stove 10. The thermostatic control device 50 is connected in-line between the stove 10 and select stove devices such that the thermostatic control device 50 can monitor and manipulate the compressor 20, fuel valve 38, flame sensor 40, and igniter 44. The thermostatic control device 50 has the ability to interrupt or switch off the compressor 20 and/or fuel valve 38 outputs. Thermostatic control device 50 also has the ability to divert compressor output to the igniter 44. Finally, the thermostatic control device has the ability to drive a high analog voltage level such that a flame on signal is simulated or, alternatively, drive a low analog voltage level such that a flame out signal is simulated.

Figure 7:
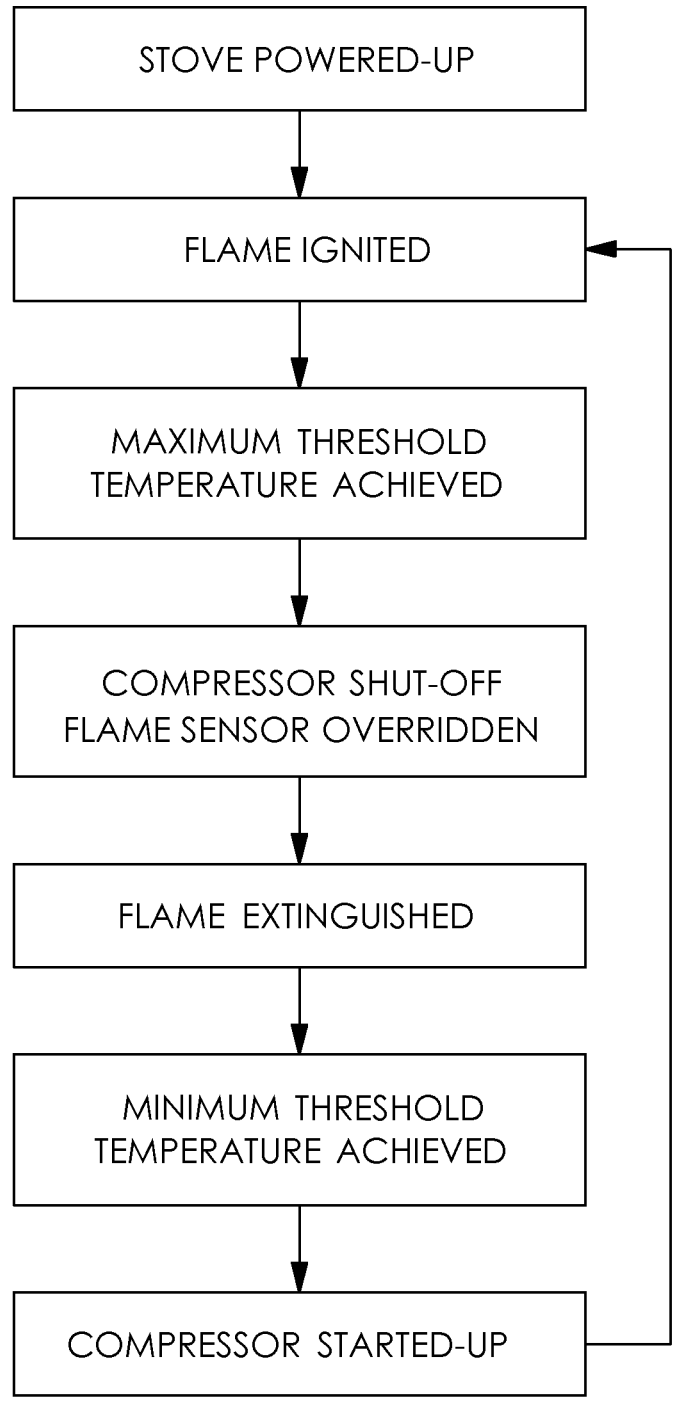
FIG. 7 is a flow chart illustrating the logic of the thermostatic control device.

Referring to FIGS. 1, 2 and 6, when the actual temperature of the appliance 11 equals or exceeds a maximum threshold temperature, the temperature sensor 54 is in communication with and signals a thermostatic control device controller 53 which is disposed in the control box 52. The thermostatic control device controller 53 in turn diverts compressor output power to the igniter 44 thereby interrupting the compressor 20. As a result, the compressor 20 is shut-off and the flame is extinguished because there is no low-pressure area to siphon fuel from the fuel tank 24 to the nozzle 18. The thermostatic control device controller 53 also drives a signal from the flame sensor 40 to a high analog voltage to simulate the presence of a flame so that the stove controller 27 acts as if a flame is still present. Accordingly, only the compressor 20 is shut-off and not the entire stove 10. The stove 10 is thereby maintained in a standby state. When the actual temperature of the appliance 11 is equal to or less than a minimum threshold temperature, the temperature sensor 54 signals the thermostatic control device controller 53. The thermostatic control device controller 53 reconnects the compressor output to the compressor 20 and drives a signal from the flame sensor 40 to a low analog voltage to simulate the absence of a flame. This causes the stove controller 27 to re-ignite the flame. As a result, fuel flows to the nozzle 18 and the flame is re-ignited. The stove 10 is thereby returned to a fully operational state. This cycle, shown in FIG. 7, is repeated as the actual temperature of the appliance 11 fluctuates between the maximum threshold temperature and the minimum threshold temperature.

The maximum threshold temperature is a temperature value which is greater than the set temperature point and, in this example, preferably 3° F. above the set temperature point. The minimum threshold temperature is a temperature value which is less than the set temperature point and, in this example, preferably 3° F. below the set temperature point. Accordingly, the thermostatic control device 50 is able to maintain the actual temperature of the appliance 11 at or about the set temperature point without requiring manual and intermittent rotation of the control knob 30. However, the thermostatic control device 50 may also have a manual setting in which the output of the burner unit 12 may be controlled through rotation of the control knob 30. The thermostatic control device 50 offers the further advantage that it does not interfere with control of the stove's vent valve 41, air valve 37, or fuel level sensor 35, thereby allowing for normal refueling of the stove as described herein.

Figure 8:
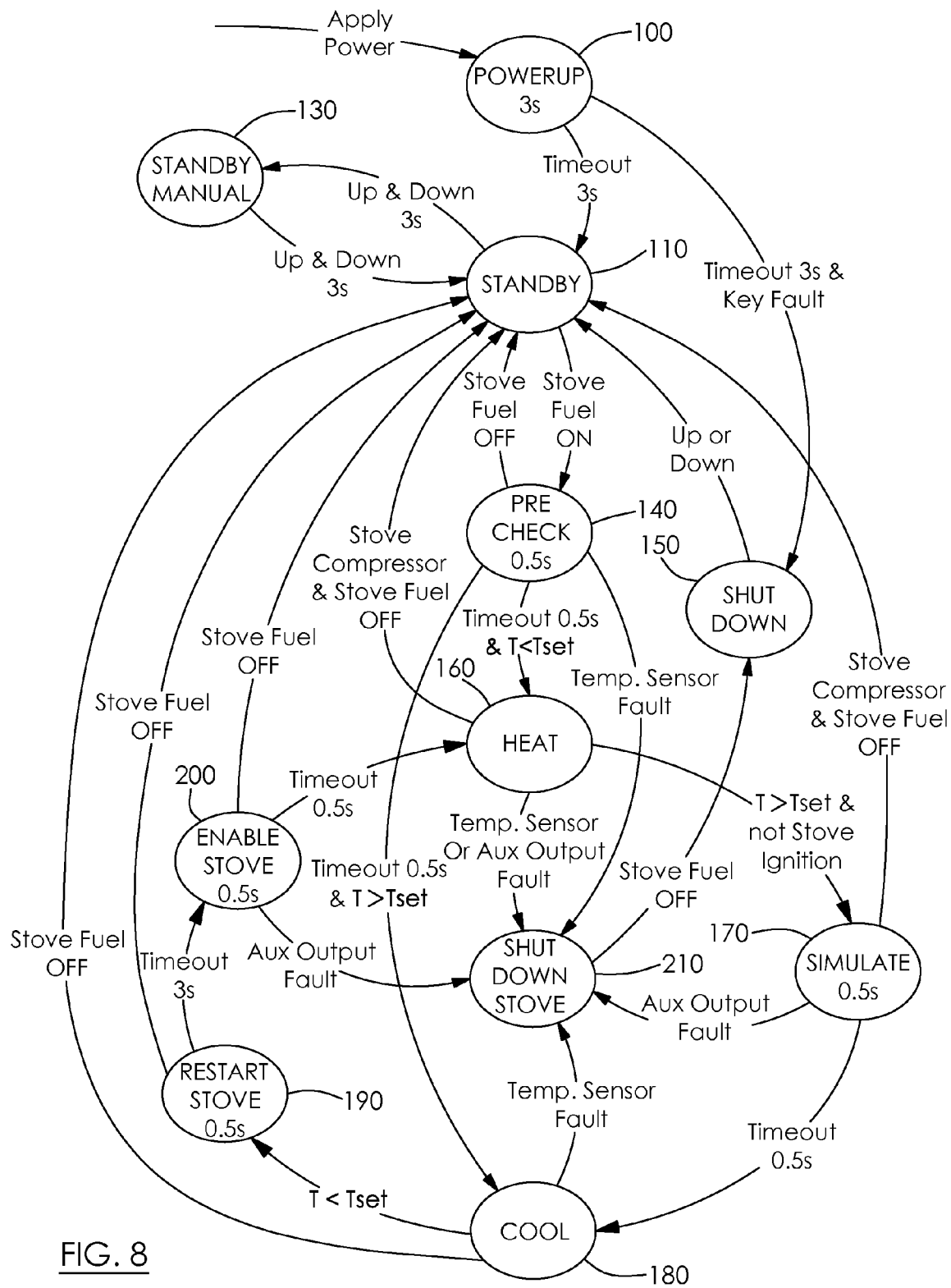
FIG. 8 is a state diagram illustrating the overall functionality of the thermostatic control device.

Referring to FIGS. 1, 6, and 8 the functionality of the thermostatic control device 50 will now be discussed. FIG. 8 is a state diagram illustrating the overall functionality of the thermostatic control device 50. Initially the stove 10 is powered up in a normal fashion to a POWERUP state as indicated by block 100. The stove 10 is then maintained in a STANDBY state, as indicated by blocks 110 and 130, while the thermostatic control device 50 monitors the actual temperature of the appliance 11 and stove outputs. If a fault is detected the stove 10 is sent to a SHUT DOWN state as indicated by block 150. Otherwise the thermostatic control unit completes a pre-check as indicated by block 140. If the actual temperature of the appliance 11 is below the set temperature point, the thermostatic control device 50 leaves all inputs and outputs unaltered, allowing the stove 10 to continue to provide heat in a HEAT state as indicated by block 160. If the actual temperature of the appliance 11 is equal to or exceeds the maximum threshold temperature, the thermostatic control device 50 prevents the burner unit 14 from igniting and goes straight to a COOL state indicated by block 180.

When the actual temperature of the appliance 11 is initially below the set temperature point, the stove 10 operates in the HEAT state indicated by block 60 to raise the temperature of the appliance 11. Once the actual temperature of the appliance 11 is equal to or exceeds the maximum threshold temperature, the thermostatic control device 50 shuts off the burner unit 12 by diverting compressor output power to the igniter 44. This provides a load to the compressor drive circuit and prevents an open circuit fault condition. The thermostatic control device 50 then drives the flame sensor signal to a high analog voltage to simulate the presence of a flame. This results in a SIMULATE state as indicated by block 170.

Power to the compressor 20 and fuel valve 38 is then interrupted to halt operation of the burner unit 12 resulting in the COOL state indicated by block 180.

In the COOL state 180 the actual temperature of the appliance 11 will decrease. Once the actual temperature of the appliance 11 is equal to or less than the minimum threshold temperature the thermostatic control device 50 restarts the stove 10 as indicated by block 190. In the RESTART state, the thermostatic control device drives the flame sensor 40 to a low analog voltage level to stimulate the absence of a flame thereby triggering the stove to re-ignite the burner unit 12. This is done by temporarily turning off the fuel valve 38 and energizing the igniter 44. After a short delay fuel is re-introduced to the burner unit 12 by turning on the fuel valve 38. Reconnecting the compressor and fuel valve outputs allows the stove controller 27 to control the compressor 20 and fuel valve 38 resulting in an ENABLE STOVE state indicated by block 200. The thermostatic control device 50 then releases the flame sensor signal so the presence of a flame is reported to the stove controller 27. At this point the stove controller 27 re-ignites the burner 14. The thermostatic control unit 50 now stops diverting compressor output power to the igniter 44 resulting in the HEAT state indicated by block 160. The stove 10 remains in the HEAT state 160 until the actual temperature of the appliance 11 is equal to or greater than the maximum threshold temperature at which point the cycle repeats. If at any point in the cycle a fault is detected a SHUT DOWN STOVE state, indicated by block 210, is triggered.

Figure 9:
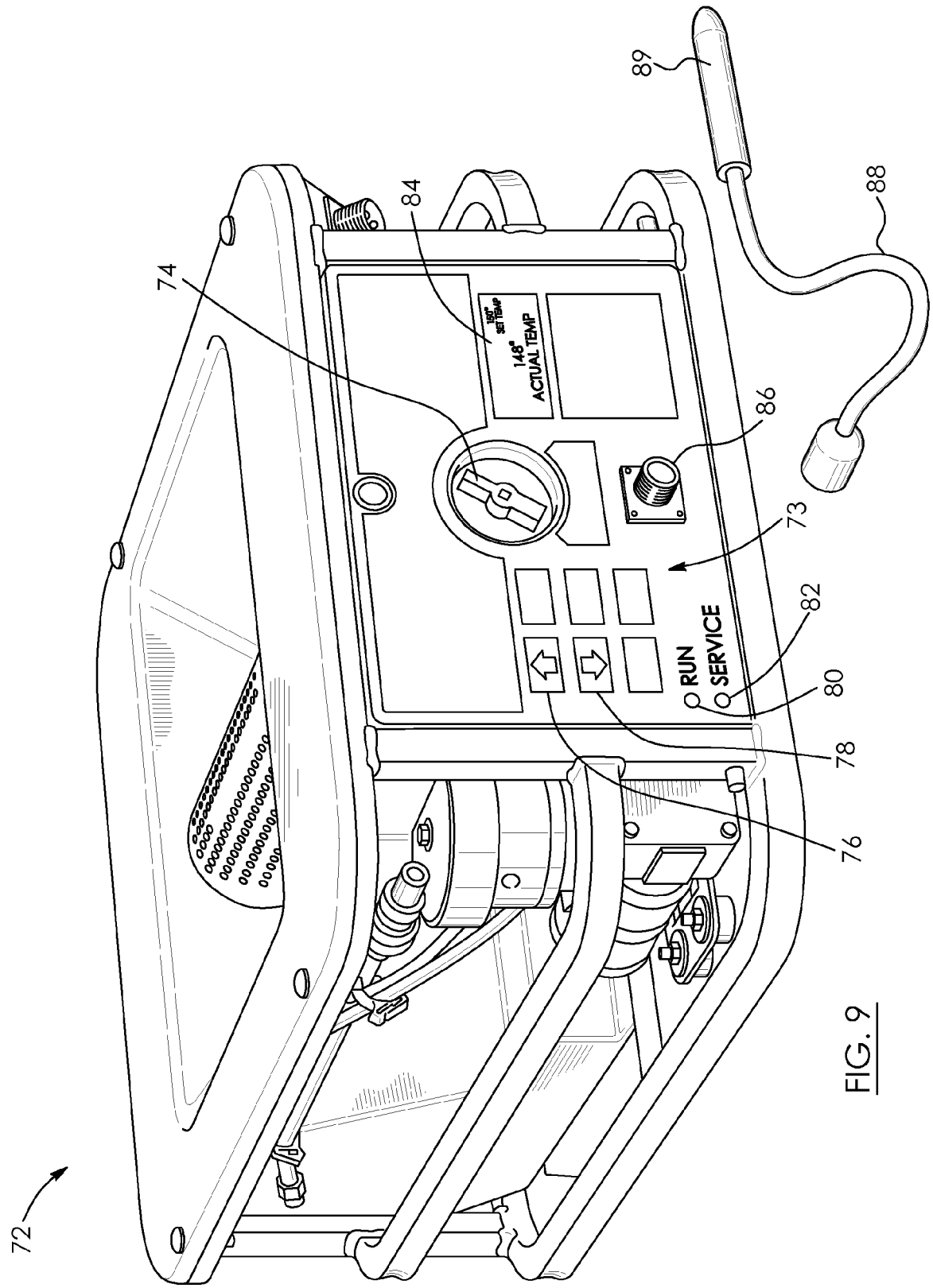
FIG. 9 is a front isometric view of a first embodiment of a stove provided with an integrated thermostatic control device.
Figure 11:
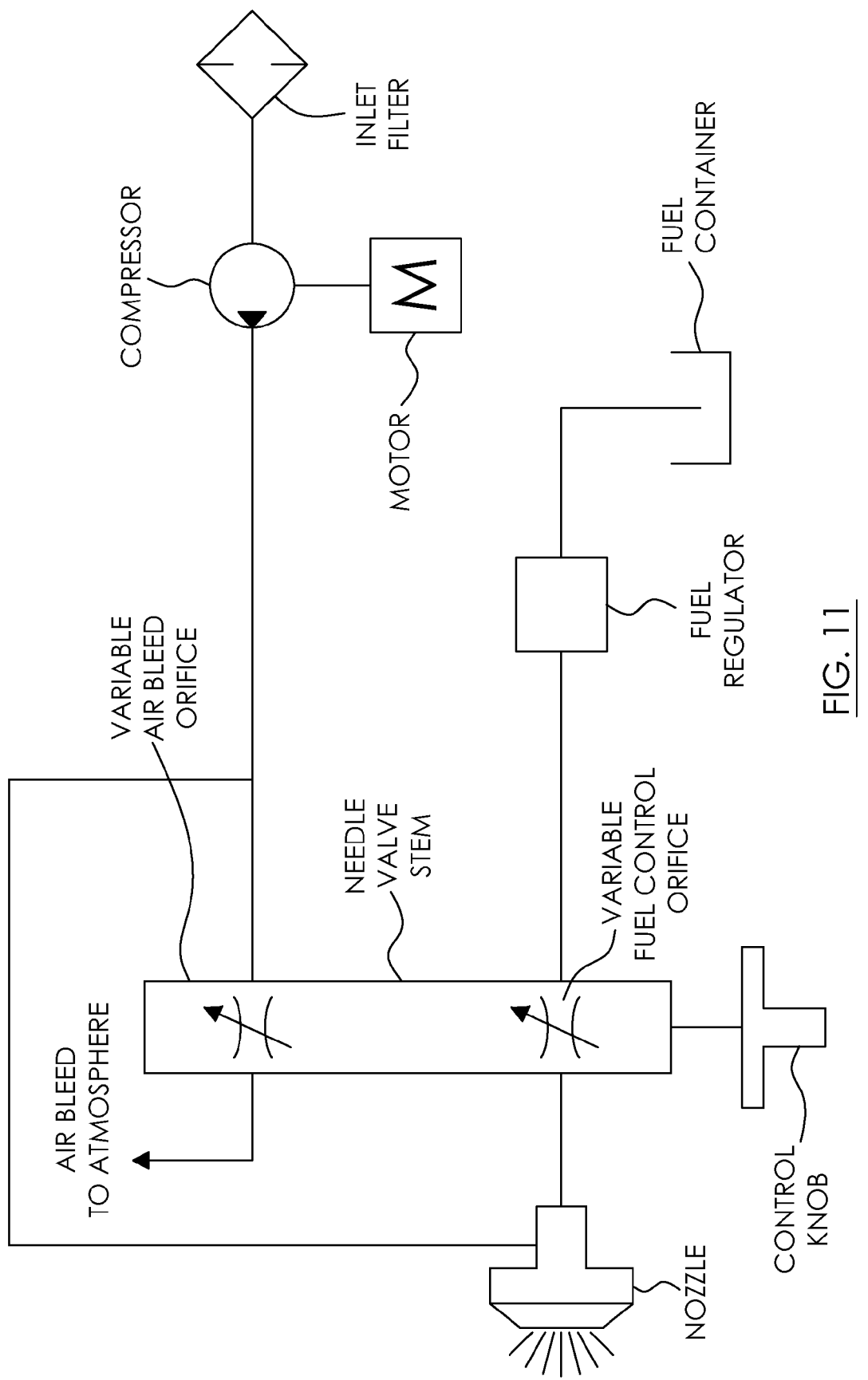
FIG. 11 is a schematic showing the fuel delivery and pressurized air assemblies of the stoves of FIGS. 9 and 10.

Referring now to FIG. 9, a first embodiment of a stove 72 provided with an integrated thermostatic control is shown. The stove 72 of FIG. 9 is generally similar to the stove 10 of FIGS. 1 to 4 and is provided with a control knob 74. However, with reference to FIG. 11, the stove 72 of FIG. 9 does not have a feedback potentiometer to control the output of the compressor. Rather, to control the output of the compressor, a variable air bleed orifice is incorporated into the needle valve which controls the flow of fuel to the nozzle. The variable air bleed orifice is used to bleed off excess pressurized air. Accordingly, as the output control knob is adjusted, both the fuel rate and the pressurized air supply are simultaneously altered to maintain a linear fuel rate.

Referring back to FIG. 9, the stove 72 also differs from the stove 10 of FIGS. 1 to 4 in that the thermostatic control is integrated into the stove 72. A control panel 73 of the stove 72 includes two input keys 76 and 78 which allow for adjustment of a set temperature point. One input key 76 is used to increase the set temperature point 78 and the other input key 78 is used to decrease the set temperature point. The control panel 73 of the stove 72 also includes two indicators 80 and 82. Indicator 80 is a green RUN indicator and signifies that the stove 72 is operating in a temperature control mode. Indicator 82 is a red SERVICE indicator and signifies that a fault has occurred. There is an easily readable alpha-numeric display 84 disposed on the control panel 73 of the stove 72 which may display the actual temperature of the stove and the set temperature point. There is also a temperature probe connection receptacle 86 disposed on the control panel 73 of the stove 72 to allow a temperature probe harness 88 and quick-connect temperature probe 89 to be coupled to the stove 72.

Figure 10:
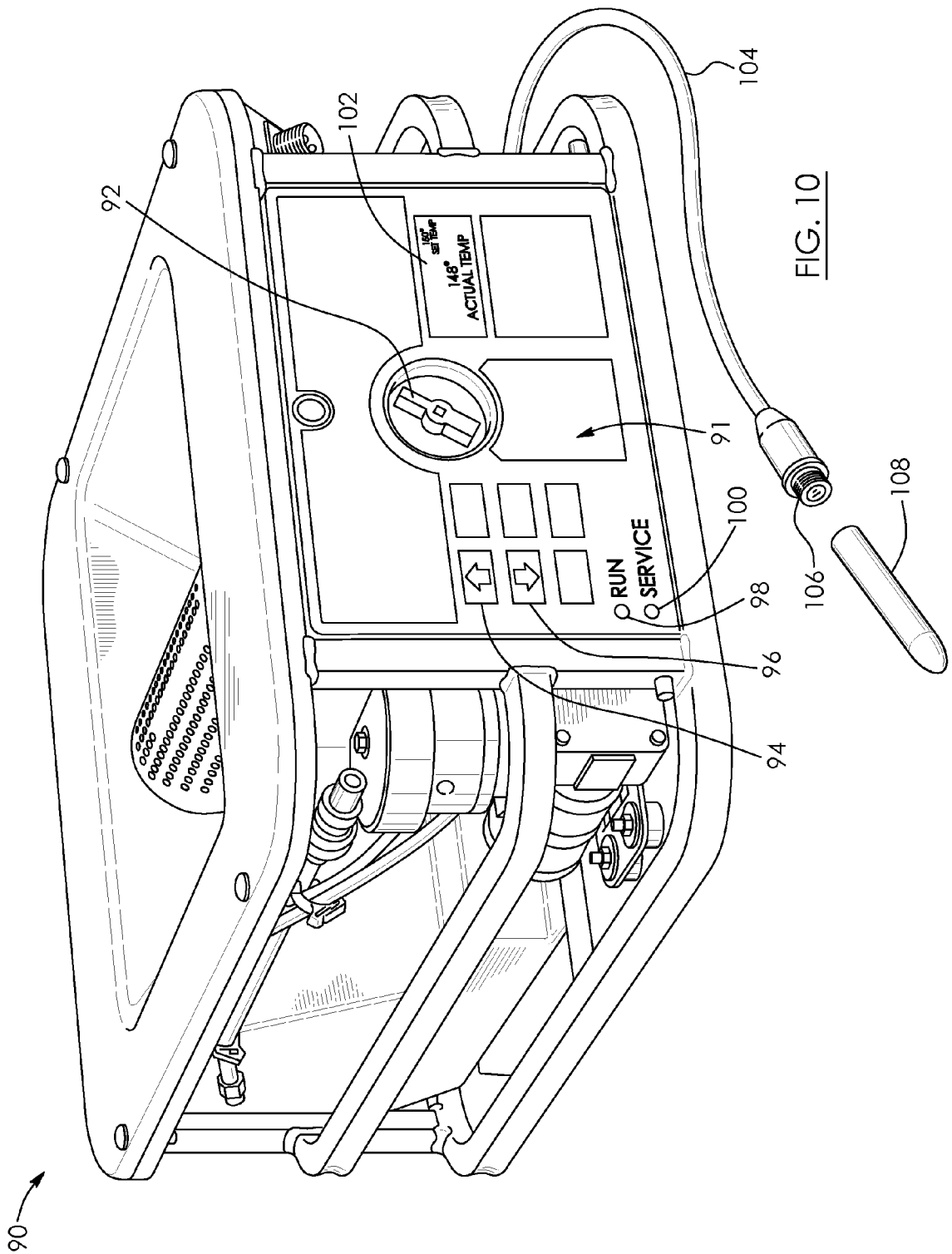
FIG. 10 is a front isometric view of a first embodiment of a stove provided with an integrated thermostatic control device.

Referring now to FIG. 10, a second embodiment of a stove 90 provided with an integrated thermostatic control is shown. The stove 90 of FIG. 10 is generally similar to the stove 72 of FIG. 9 and is provided with a control knob 92. There is also a control panel 91 with two input keys 94 and 96 to set a temperature point, two indicators 98 and 100 to signify either a RUN control mode or a SERVICE fault mode, and an alpha-numeric display 102 to display temperature or other information. However, the stove 90 of FIG. 10 differs from the stove 72 of FIG. 9 in that the stove 90 does not have a temperature probe connection receptacle. Rather the stove 90 is provided with an integral temperature probe harness 104 with a temperature probe connector 106, thereby allowing a quick-connect temperature probe 108 to be connected to the stove 90.

The stoves 72 and 90 integrate closed-loop temperature functionality directly into the stove controller and take advantage of existing microprocessor control and driver circuits. The integration of the closed-loop temperature functionality into the stoves requires a temperature sensing circuitry similar to that of the thermostatic control device 50 shown in FIG. 5. Also required is a means to couple a temperature probe to the stove, e.g. a temperature probe connection receptacle or an integral temperature probe harness with a probe connector. Additional input keys, indicators and alpha-numeric display may be included.

It will be understood by a person skilled in the art that although in the example provided above the thermostatic control device is interfaced with or integrated into a stove, that in other examples the thermostatic control device may be interfaced with any appliance comprising a burner. Alternatively, the thermostatic control device may be integral with any appliance comprising a burner.

It will be further understood by someone skilled in the art that many of the details provided above are by way of example only and are not intended to limit the scope of the invention which is to be determined with reference to the following claims.

What is claimed is:

1. An appliance comprising:
   a burner;
   a compressor for supplying pressurized air to the burner in order to create a low pressure area for siphoning fuel to the burner;
   a flame sensor for sensing the presence or absence of a flame in the burner;
   a temperature sensor for sensing an actual temperature of the appliance;
   a controller in communication with the temperature sensor, the controller shutting-off the compressor and overriding the flame sensor such that the appliance acts as if a flame is present when the temperature sensor senses that the actual temperature of the appliance is greater than a maximum threshold temperature, the controller starting-up the compressor and overriding the flame sensor such that the appliance acts as if a flame is absent when the temperature sensor senses that the actual temperature of the appliance is less than a minimum threshold temperature; and
   a control panel in communication with the controller, the control panel having an input control mechanism for inputting a desired set temperature point into the controller and a display for displaying the actual temperature of the appliance and the set temperature point, wherein the set temperature point is greater than the minimum threshold temperature and the set temperature point is less than the maximum threshold temperature.

2. The appliance as claimed in claim 1 wherein the input control mechanism includes two input keys which respectively allow for upward and downward adjustment of the set temperature point.

3. The appliance as claimed in claim 1 further including a temperature probe connection receptacle on the control panel.

4. The appliance as claimed in claim 3 wherein the temperature sensor is a quick-connect temperature probe.

5. The appliance as claimed in claim 1 further including an integral temperature probe connection harness with a temperature probe connector.

6. The appliance as claimed in claim 5 wherein the temperature sensor is a quick-connect temperature probe.

7. The appliance as claimed in claim 1 wherein the appliance is a food preparation appliance or a sanitation appliance.

\* \* \* \* \*